United States Patent
Sundaram et al.

(10) Patent No.: US 10,091,055 B2
(45) Date of Patent: Oct. 2, 2018

(54) CONFIGURATION SERVICE FOR CONFIGURING INSTANCES

(71) Applicant: Amazon Technologies, Inc., Seattle, WA (US)

(72) Inventors: Manivannan Sundaram, Bothell, WA (US); Manoj Krishna Ghosh, Kirkland, WA (US); Nikolaos Pamboukas, Renton, WA (US); Martin Chen Mao, Seattle, WA (US); Aaron Jeremiah Sheldon, Seattle, WA (US); Sivaprasad Venkata Padisetty, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 69 days.

(21) Appl. No.: 14/622,765

(22) Filed: Feb. 13, 2015

(65) Prior Publication Data
US 2016/0241438 A1    Aug. 18, 2016

(51) Int. Cl.
| G06F 15/177 | (2006.01) |
| H04L 12/24 | (2006.01) |
| G06F 9/455 | (2018.01) |
| G06F 9/445 | (2018.01) |
| G06F 9/44 | (2018.01) |

(52) U.S. Cl.
CPC ...... H04L 41/0806 (2013.01); G06F 9/45558 (2013.01); *G06F 9/44* (2013.01); *G06F 9/445* (2013.01)

(58) Field of Classification Search
CPC ............. H04L 41/0806; G06F 9/45558; G06F 9/45562; G06F 9/44; G06F 9/445

USPC ........................................................ 709/222
See application file for complete search history.

(56) References Cited

U.S. PATENT DOCUMENTS

| 8,560,699 | B1 | 10/2013 | Theimer et al. |
| 9,176,759 | B1* | 11/2015 | Sahasranaman .... G06F 9/45558 |
| 9,229,850 | B1* | 1/2016 | Wang ................... G06F 9/5016 |
| 2006/0085517 | A1 | 4/2006 | Kaurila |
| 2008/0307414 | A1* | 12/2008 | Alpern ................ G06F 9/45558 718/1 |

(Continued)

OTHER PUBLICATIONS

Dictionary.com, "Define Selective at Dictionary.com", Apr. 12, 2017, http://www.dictionary.com/browse/selective.*

(Continued)

*Primary Examiner* — James E Springer
(74) *Attorney, Agent, or Firm* — Klarquist Sparkman, LLP

(57) ABSTRACT

A service is disclosed that allows configuration, management and deployment of instances. A configuration document can be stored by the service and one or more instance identifiers can be linked to the configuration document. As a result, multiple instances can be launched and configured using a single configuration document allowing for a consistent result across instances. Local agents running on the instances can execute plug-ins in order to effectuate the configuration. As a result, administrators of instances can configure, manage and easily deploy their unique instance configurations. Customers who manage their instances can scale and manage their entire fleet with repeatable configuration tasks that seamlessly integrate into their instance workflow.

18 Claims, 9 Drawing Sheets

(56) References Cited

U.S. PATENT DOCUMENTS

| | | | | |
|---|---|---|---|---|
| 2010/0293541 A1* | 11/2010 | Pall | ............................ | G06F 8/61 717/178 |
| 2011/0126192 A1 | 5/2011 | Frost et al. | | |
| 2011/0265073 A1* | 10/2011 | Vidal | ........................ | G06F 8/65 717/170 |
| 2012/0066681 A1* | 3/2012 | Levy | ..................... | G06F 9/5027 718/1 |
| 2012/0304167 A1* | 11/2012 | Robinson | ................... | G06F 8/63 717/177 |
| 2013/0007739 A1* | 1/2013 | Poddar | ...................... | G06F 8/63 718/1 |
| 2013/0167148 A1* | 6/2013 | Lee | ..................... | G06F 9/45558 718/1 |
| 2013/0227089 A1* | 8/2013 | McLeod | ............. | G06F 9/45558 709/220 |
| 2013/0232498 A1* | 9/2013 | Mangtani | .............. | G06F 9/5072 718/104 |
| 2013/0283263 A1* | 10/2013 | Elemary | ............. | G06F 9/45558 718/1 |
| 2014/0019960 A1* | 1/2014 | Jacklin | ................ | G06F 9/45558 718/1 |
| 2014/0244716 A1* | 8/2014 | Stam | .................... | H04L 9/45558 718/1 |
| 2014/0337832 A1 | 11/2014 | Adogla | | |
| 2014/0351815 A1* | 11/2014 | Conover | ............. | G06F 9/45558 718/1 |
| 2015/0067838 A1* | 3/2015 | Gunti | ...................... | G06F 21/51 726/22 |
| 2015/0121375 A1* | 4/2015 | Balasubramanyam | ...................... | H04L 47/70 718/1 |
| 2015/0178113 A1* | 6/2015 | Dake | ................... | G06F 9/45558 718/1 |
| 2015/0363181 A1* | 12/2015 | Alberti | ................ | G06F 9/45558 717/177 |

OTHER PUBLICATIONS

International Search Report and Written Opinion for PCT/US2016/017381, dated Jun. 8, 2016, 11 pages.
Written Opinion of the International Searching Authority for PCT/US2016/017381, dated Aug. 15, 2017, 8 pages.

* cited by examiner

CONFIGURATION SERVICE FOR CONFIGURING INSTANCES

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

In cloud computing, a virtual machine (VM) is an emulation of a particular computer system. Virtual machines operate based on the computer architecture and functions of a real or hypothetical computer, and their implementations may involve specialized hardware, software, or a combination of both. Virtual machine configuration is the arrangement of resources assigned to a virtual machine. The resources allocated to a virtual machine typically include allocated processors, memory, disks, network adapters, user interface, applications, operating system configuration, etc. Configuration refers to both the specific elements included and the way those elements are set up.

Currently, configuration requires a customer to submit a particular API for each instance launched. The APIs can become difficult to manage, particularly when a customer is managing a fleet of virtual machine instances. New techniques are needed to assist customers with configuration of virtual machine instances.

DETAILED DESCRIPTION

A service is disclosed that allows configuration, management and deployment of computers, such as physical machine instances, virtual machine instances, etc. A configuration document can be stored by the service and one or more instance identifiers can be linked to the configuration document. As a result, multiple virtual machine instances can be launched and configured using a single configuration document allowing for a consistent result across instances. Local agents running on the instances can execute plug-ins in order to effectuate the configuration. As a result, administrators of computers, such as virtual machine instances, can configure, manage and easily deploy their unique instance configurations. Customers who manage their instances can now scale and manage their entire fleet with repeatable configuration tasks that seamlessly integrate into their instance workflow. Some scenarios that are supported include: simplify common configuration tasks, such as creating user accounts, running scripts, and bootstrapping application packages. Additionally, customers can manage collection and tracking of metrics from within the instance. Customers can create configuration documents store it in central location allowing for sharing across teams.

Generally speaking, a "plug-in" includes, but is not limited to, a software component that plugs into a larger application to add functionality. When an application supports plug-ins, it can, for example, enable customization without recompilation. Additionally, in some instances, plug-ins can reduce the need for redeployment of the larger application, as functionality can be added through the plug-ins without modifying or redeploying the application itself. The common examples are the plug-ins used in web browsers to add new features such as search-engines, virus scanners, or the ability to utilize a new file type, such as a new video format.

Figure 1:
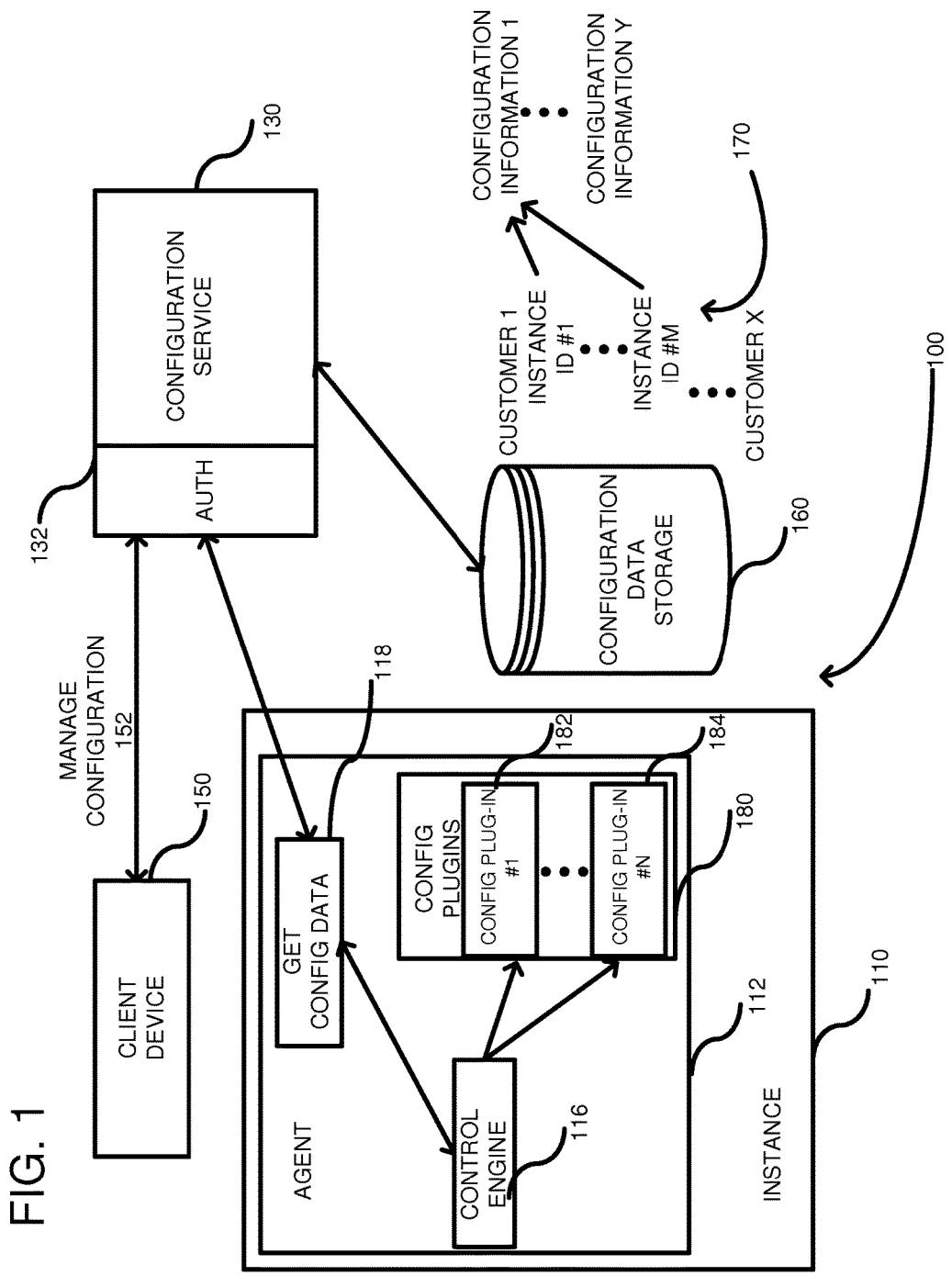
FIG. 1 is a system including a configuration service for configuring virtual machine instances.

FIG. 1 is an example of a system 100 for configuring instances, such as instance 110, which can be a physical machine instance (e.g., software executing on a server computer, mobile phone, tablet, laptop, etc.), or a virtual machine instance, such as a virtual machine operating on a server computer. In either case, the instance is software executing on a computer. The instance 110 includes an agent 112, which can be an application running on the instance operating system or can be embedded within the operating system. The agent 112 can include a control engine 116, which can be a plugin framework or other program for controlling configuration of the instance 110. A plugin 118 (named "Get Config Data") can be in communication with the control engine 116 and be designed to obtain configuration data in response to requests from the control engine. Such requests can be on startup of the instance 110, but can also be at periodic intervals (e.g., every 10 minutes) or upon an occurrence of one or more trigger events. Although not shown, the "Get Config Data" plugin can be integrated into the control engine. The plugin 118 can communicate with a configuration service 130 executing on a separate server computer than the instance 110. The configuration service 130 can include an authentication component 132, which may authenticate credentials of the agent 112, computer system, process, automated process or other such entity to at least determine whether that entity is authorized to access the configuration service and/or the system resources associated with the configuration service. In some embodiments, the credentials may be authenticated by the configuration service itself, or they may be authenticated by a process, program or service under the control of the configuration service, or they may be authenticated by a process, program or service that the configuration service communicates with, or it can be authenticated by a combination of these and/or other such services or entities. In alternative embodiments, the authentication 132 can be removed completely from the configuration service 130.

A client device 150 is shown communicatively coupled to the configuration service 130 through a network (not shown) in a typical client/server configuration. The client device may include any device that is capable of connecting with a computer system via a network, including at least servers, laptops, mobile devices, such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as Bluetooth, WiFi, cellular network protocols, satellite network protocols and/or others.

The client device 150 can issue requests to the configuration service, such as API requests. In such a case, the configuration service can act as a web service operating on a server computer. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. The API requests may also need to pass through the authentication portion 132 of the configuration service.

There are a number of possible API requests. One such API request 152 is generically shown as manage configuration, which can include submitting a configuration document to the configuration service 130, or associating a configuration to an instance identifier, reading a configuration document, updating a configuration document, etc. The configuration document can include configuration information, which can be used to identify various plug-ins to execute, as further described below. The configuration document can be a text document, such as a JSON document, but other formats can be used. Configuration of the instances can relate to configurations that occur after launching. Thus, the configuration can be related to how software on the instances is configured. Examples include identification of the applications are installed on the instance, which operating system is installed and how the operating system configuration is set, log-in permissions, how user accounts are configured, names associated with the instance, etc. Virtually any post-launch configuration parameters can be used. One skilled in the art will recognize that the techniques described herein can be applied to configuring a instance during launching, instead of after launching.

Another type of API request includes associating the configuration document to an instance identification. Each instance that is launched can have an associated identification, such as a globally unique identification (GUID). Using the configuration service 130, multiple instance identifiers can be associated with the same configuration document. Both the configuration document, together with the associated instance identifiers can be stored in storage 160. The storage can be any type of desired storage, such as a database, internal or external hard drive, memory, solid state drive, network attached storage (NAS), cloud storage, etc. As shown at 170, multiple customers (1-X, where X is any number) can have configuration documents stored in the configuration data storage 160 by the configuration service 130. Each customer can have multiple configuration documents (shown as configuration information 1-Y, where Y is any number) and each configuration document can have multiple instance identifications associated therewith. For example, configuration information 1 can have multiple instance identifiers (1-M, where M is any integer number) associated therewith. The configuration information can have multiple configuration sections. Example sections can be an operating system section, an application section, a log-in permissions section, etc. Each section can establish how to configure software associated with the instance. By having multiple instance identifiers associated with a same configuration document, a fleet of instances can be managed using a same configuration document. Thus, a customer can provide a single update to the configuration information 1, and that update can be automatically deployed to the customer's entire fleet using the configuration service. Additionally, the customer can at any point associate a new instance identification to a configuration document, such as using the API 152.

After launching, the instance 110 executes the agent 112. The control engine 116 within the agent executes the plug-in "get config data" 118 that transmits an API request to the configuration service 130. The API request includes an instance identifier and a customer number. Various authentication can occur through the authentication component 132 to ensure that the agent 112 is verified. Once the agent 112 is authenticated, the configuration service 130 can use the customer identifier and the instance identifier to locate the configuration information associated with the instance identifier. The configuration service 130 can then pass the configuration information back to the agent 112 for use by the control engine 116. The control engine 116 can then search through the configuration information for different sections. For each section that is identified, the control engine can call (execute) one or more plugins, such as plugins 182 through 184 (N number of plugins can be called, where N is any number). The plugins 182 through 184 implement the configuration of the instance 110.

One feature is that the configuration information is stored by configuration service 130 and is generic. Implementation details can be omitted in the configuration information. By contrast, the control engine 116 determines how to implement the configuration through execution of the various plugins 182-184. The plugins 182-184 can be simple executable subroutines that are called by the control engine in order to configure the instance 110. The plugins can be locally stored such that the agent 112 need not fetch the plugins. Alternatively, the plugins can be determined and retrieved by the control engine from a separate storage (not shown). In either case, the agent 112 determines from the configuration information which one or more plugins to execute. The control engine 116 can periodically execute the plugin 118 in order to determine if any updates to the stored configuration information are available. If so, the updated configuration information can be automatically applied to the instance 110. Other instances can likewise automatically retrieve the updated configuration information and apply it. Indeed, any instance having an instance identifier associated with the configuration information can be updated automatically. As a result of the above-described structure, configuration implementation details are handled by the agent and are separate from the generic configuration requirements, which are stored by the configuration service.

Figure 2:
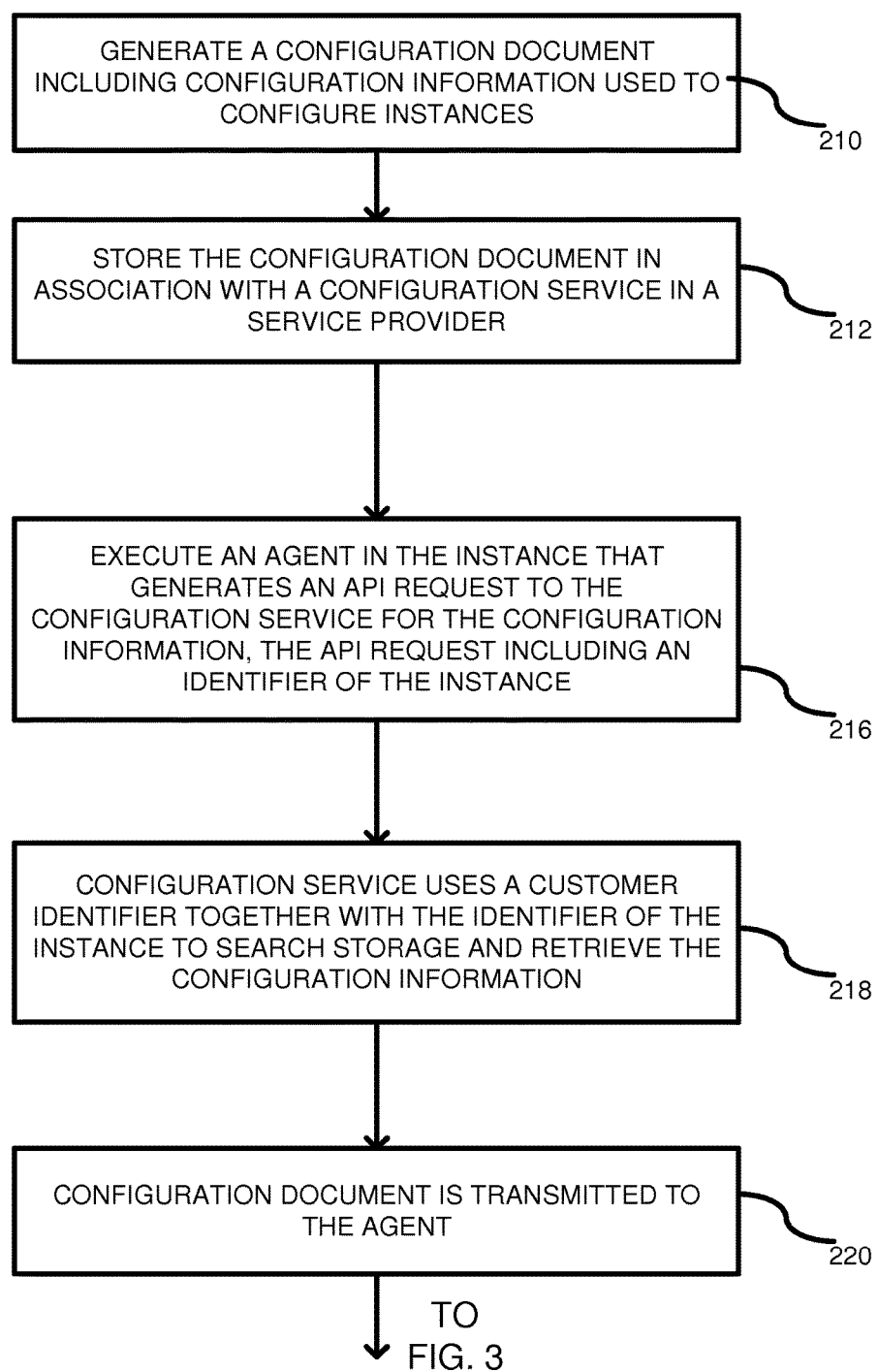
FIG. 2 is a flowchart of a method according to one embodiment for configuring a virtual machine instance.

FIG. 2 is a flowchart of a method according to one embodiment for implementing the system of FIG. 1. In process block 210, a configuration document that includes configuration information can be generated. The configuration document can be used to configure a computer, which can include virtual machine instances or physical machine instances. The configuration document can be in any desired format, such as a text document, XML document, HTML document, JSON document, etc. The configuration is typically generated by a customer and transmitted to a service, such as the configuration service 130. In process block 212, the configuration document can be stored in association with a configuration service in a service provider. For example, a web service associated with a service provider (e.g., cloud provider) can be used to receive the configuration document and store it using the storage of the service provider. Typically, the storage is on a server computer, but other types of storage can be used, including traditional directory-based file storage or object-based storage. In process block 216, an agent executing on the instance can generate an API request to the configuration service for configuration information. The API request can include an identifier of the instance. Other metadata can be included in the request if desired, such as a customer identifier of the entity that launched the instance. In process block 218, the configuration service can use the customer identifier together with the identifier of the instance to search storage. The customer identifier can be a customer account number. For example, one or both identifiers can be used as keys in accessing the storage so as to locate the configuration document. Alternatively, one or both identifiers can be used in building a pointer to the configuration document, such as an object identifier. In process block 220, the configuration document is transmitted to the agent. For example, the configuration document can be transmitted as a response to the previously received API request.

Figure 3:
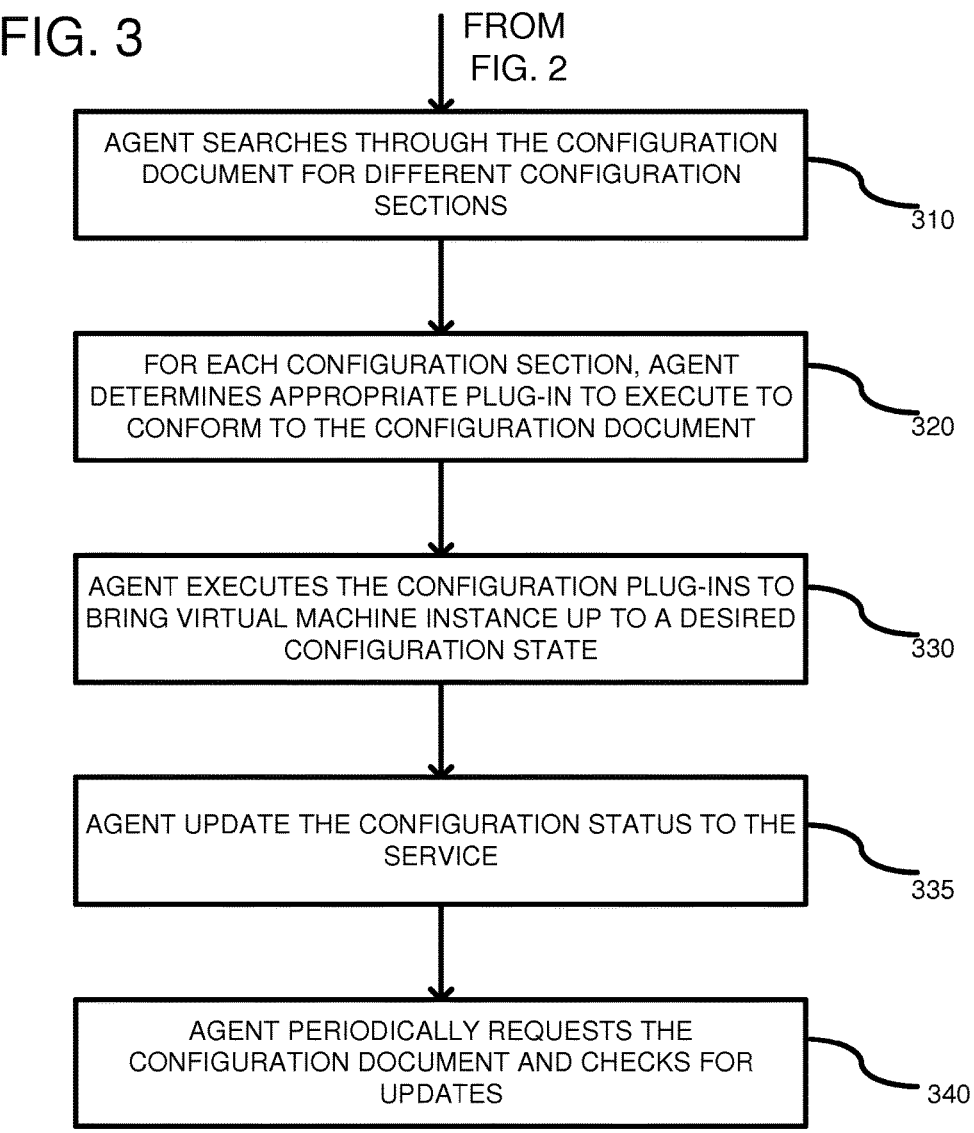
FIG. 3 is a flowchart showing additional process blocks used in conjunction with FIG. 2.

FIG. 3 continues the flowchart of FIG. 2. In process block 310, the agent within the instance receives the configuration document and searches through the same for different configuration sections. For example, different sections can have identifiers to indicate a section break together with configuration information indicating particular features to configure on the instance. The configuration information can be used to bring an operating system or applications executed on the instance up to a predetermined state. In process block 320, for each configuration section that is identified, the agent determines an appropriate plug-in to execute to conform to the configuration document. Thus, the agent applies the desired configuration by selecting an appropriate plug-in so as to implement the identified configuration information. In process block 330, the agent executes the configuration plug-ins to bring the instance up to a desired configuration state. In process block 335, the agent can update the configuration status with the service. In process block 340, the agent can periodically (e.g., every 10 minutes) request the configuration service for the configuration document. Once the configuration document is received, the agent can either re-implement all of the configuration information or it can compare against existing settings to determine if any configuration updates were received. If updates are received, the agent can select the appropriate plug-in so as to implement the configuration.

Figure 4:
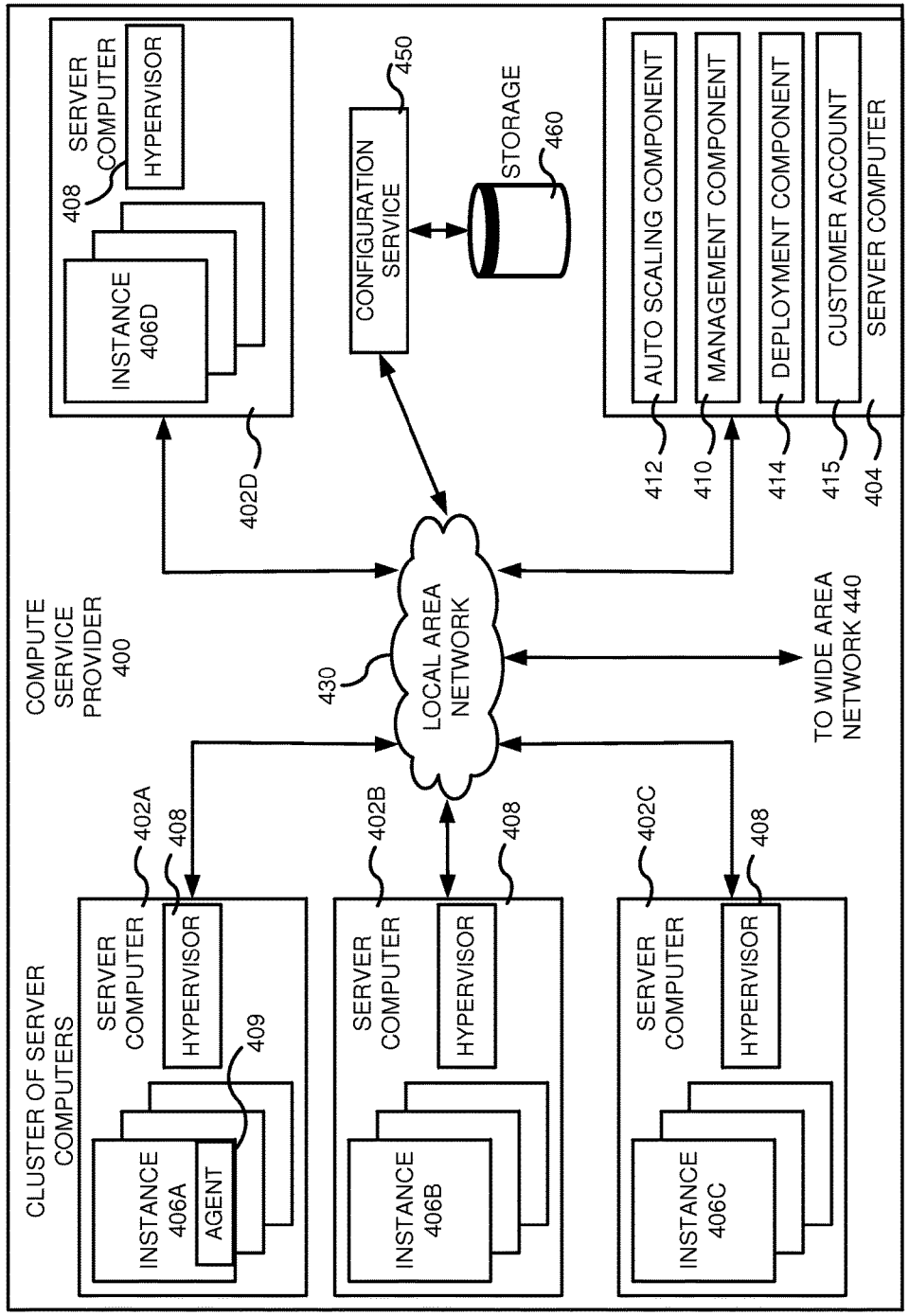
FIG. 4 is an example system diagram showing a plurality of virtual machine instances running in the multi-tenant environment with an agent running on at least one of the virtual machine instances for performing a configuration in conjunction with a configuration service.

FIG. 4 is a computing system diagram of a network-based compute service provider 400 or service provider that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications. An agent 409 can be positioned on one or more of the instances 406. The agent 409 can be executing as part of an operating system or it can be an application executing on the instance 406. In either case, the agent 409 can obtain information about the instance, such as a virtual machine instance identifier, as is well-understood in the art. For example, a metadata service (not shown) executing on the server computer 402 can be called by the agent in order to obtain metadata associated with the instance 406.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein.

A configuration service 450 can be used to store configuration information in storage 460. The configuration service 450 can associate virtual machine identifiers with the configuration information so that a fleet of virtual machines can be managed using a single configuration document. A customer can also have multiple configuration documents and have different virtual machine identifiers associated with different of the configuration documents. Implementation details of the configuration itself can be handled by the agent 409 through various plug-ins as already described.

Figure 5:
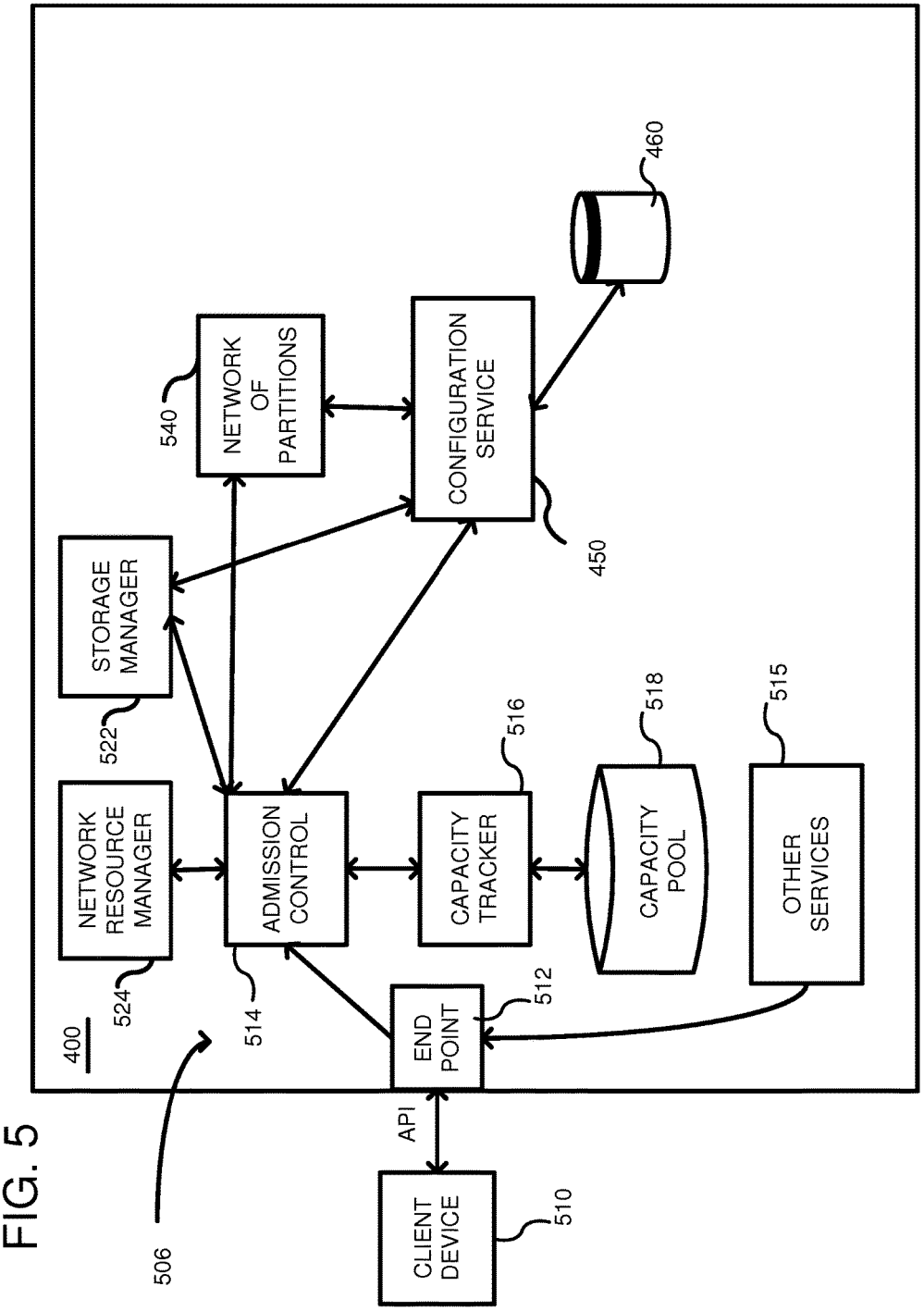
FIG. 5 shows further details of an example system including a plurality of management components associated with a control plane, with the configuration service positioned within the control plane.

FIG. 5 illustrates in further detail management components 506 that can be used in the multi-tenant environment of the compute service provider 400. In order to access and utilize instances (such as instances 406 of FIG. 4), a client device can be used. The client device 510 can be any of a variety of computing devices, mobile or otherwise including a cell phone, smartphone, handheld computer, Personal Digital Assistant (PDA), desktop computer, etc. The client device 510 can communicate with the compute service provider 400 through an end point 512, which can be a DNS address designed to receive and process API requests. In particular, the end point 512 can be a web server configured to expose an API. Using the API requests, a client 510 can make requests to implement any of the functionality described herein. Other services 515, which can be internal to the compute service provider 400, can likewise make API requests to the end point 512.

Other general management services that may or may not be included in the compute service provider 400 include an admission control 514, e.g., one or more computers operating together as an admission control web service. The admission control 514 can authenticate, validate and unpack the API requests for service or storage of data within the compute service provider 400. The capacity tracker 516 is responsible for determining how the servers need to be configured in order to meet the need for the different instance types by managing and configuring physical inventory in terms of forecasting, provisioning and real-time configuration and allocation of capacity. The capacity tracker 516 maintains a pool of available inventory in a capacity pool database 518. The capacity tracker 516 can also monitor capacity levels so as to know whether resources are readily available or limited. A storage manager 522 and the network resource manager 524 can also be coupled to the admission control. The storage manager 522 relates to initiation and termination of storage volumes (object-based storage), while the network resource manager 524 relates to initiation and termination of routers, switches, subnets, etc. A network of partitions 540 is described further in relation to FIG. 6 and includes a physical layer upon which the instances are launched.

Figure 6:
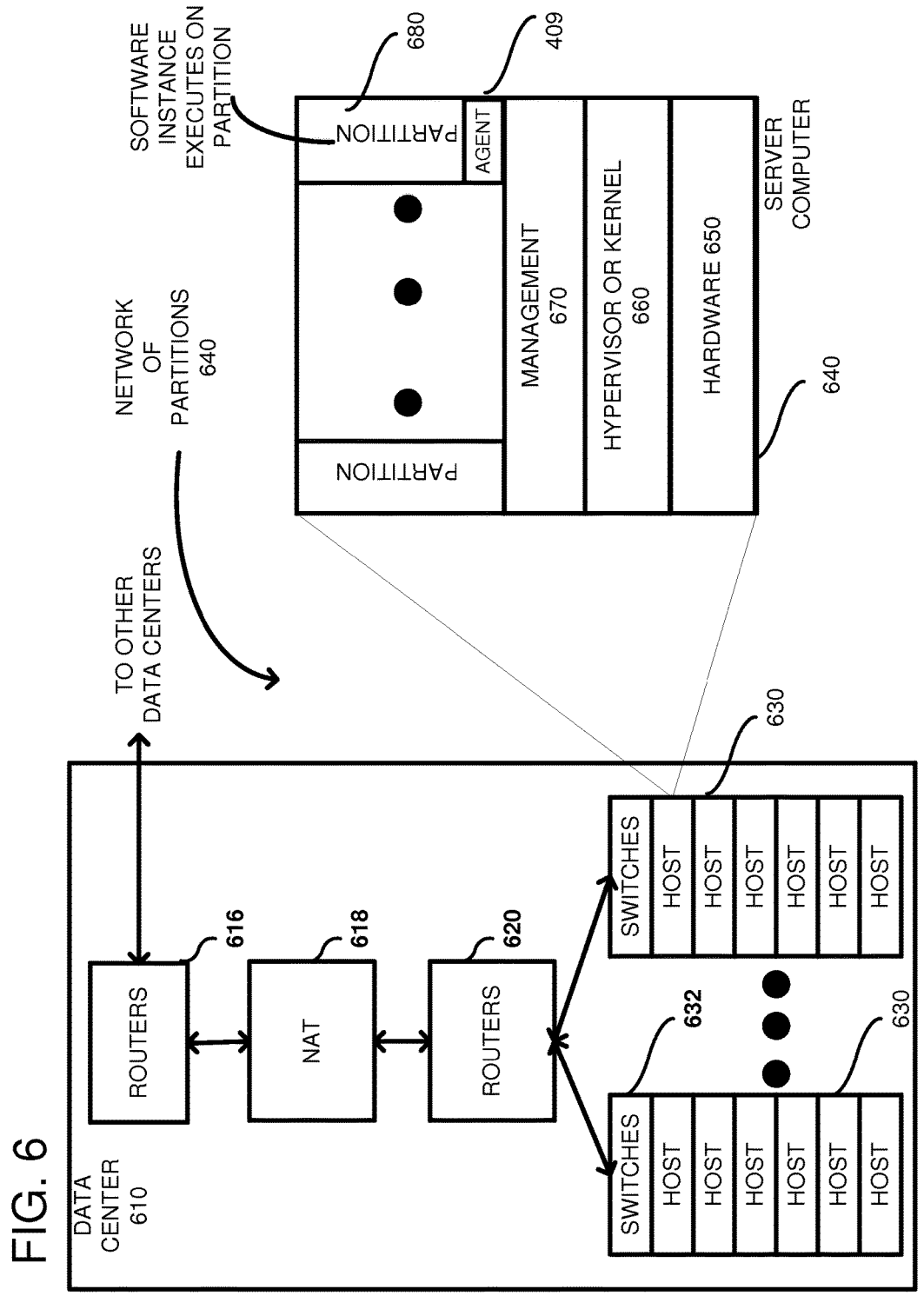
FIG. 6 shows an example of a plurality of host computers, routers and switches, which are hardware assets used for running virtual machine instances, with an agent positioned on one of the virtual machine instances for configuration thereof and for communication with the configuration service of FIG. 5.

The configuration service 450 can be coupled to the network of partitions 540 so as to communicate with the local agents 409 on the instances, as further shown in FIG. 6. The configuration service 450 can store all or part of the configuration information in storage 460 and all or part of the configuration information using the storage manager 522.

FIG. 6 illustrates the network of partitions 540 and the physical hardware associated therewith. The network of partitions 540 can include a plurality of data centers, such as data center 610, coupled together by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address. The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. A particular host server computer is shown in an expanded view at 640.

Each host 640 has underlying hardware 650 including one or more CPUs, memory, storage devices, etc. Running a layer above the hardware 650 is a hypervisor or kernel layer 660. The hypervisor or kernel layer can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

The agent 409 can execute on the partition 680, which is itself executing a virtual machine instance. The agent 409 can communicate with the configuration service 450 through the management layer 670. For example, the agent 409 can transmit a request for the configuration document associated with a virtual machine instance identifier. In response, the configuration service 450 can retrieve the configuration document using the identifier as a key to access storage 460 or it can use the identifier as part of an object identifier to obtain the configuration document from the storage manager 522. A customer identification can also be used in combination with the virtual machine instance identifier to generate the key.

Figure 7:
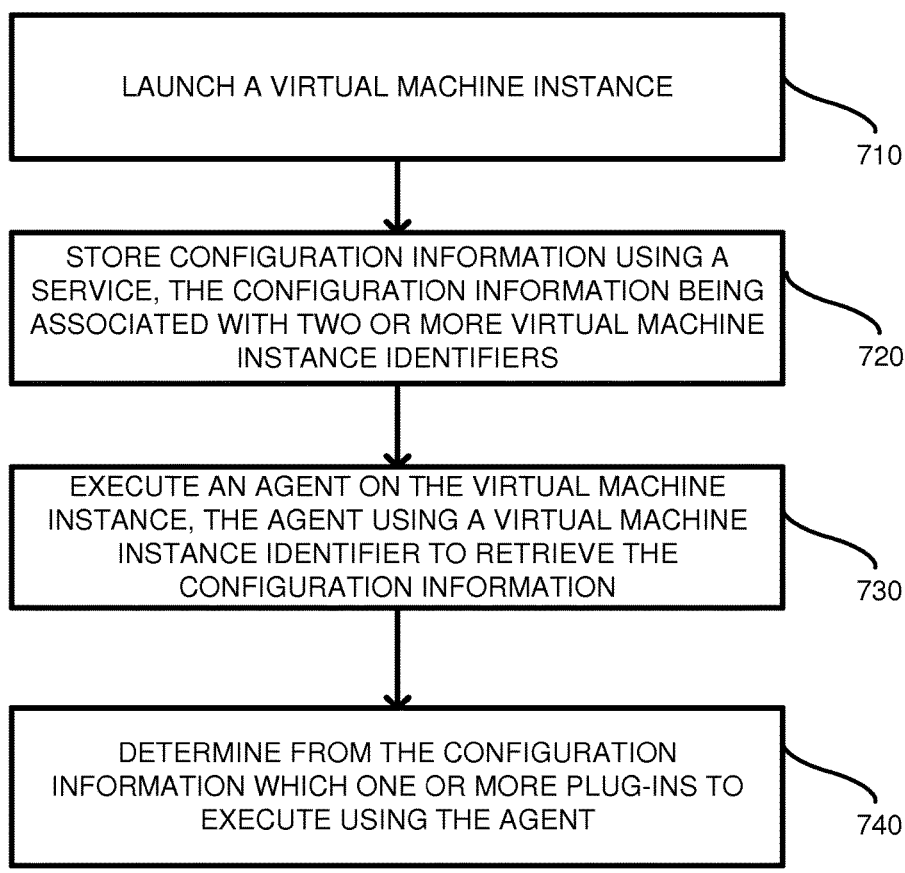
FIG. 7 is a flowchart of a method according to one embodiment for configuring a virtual machine instance.

FIG. 7 is a flowchart of an embodiment for configuring virtual machine instances in a service provider. In this embodiment, although described in relation to virtual machine instance, the method can be applied to physical machine instances. In process block 710, a virtual machine instance is launched. The launching of the virtual machine instance can be the result of a request from a user/customer, having a customer identifier associated therewith. For example, the service provider can have a plurality of customers making up a multi-tenant environment and a request (e.g., API request) can be received from one of the customers. The service provider can use a deployment component, such as was shown at 414 in FIG. 4, to launch the instance. In process block 720, configuration information can be stored using a service within the service provider. For example, a configuration service 450 can store a configuration document (e.g., a text file or other file type) including the configuration information in a variety of storage mechanisms, such as local storage, a separate storage 460 or using a storage manager 522, which itself is a service of the service provider 400. Typically, the configuration service is executing on a server computer and local storage (memory or hard drive) can also be used to store the configuration information. The configuration information can be supplied through a client-supplied API request or other type of request to the configuration service. Additionally, the API request or separate requests can be made to supply the virtual machine instance identifiers to the configuration service to associate the identifiers with the configuration information. The configuration information can be stored before or after process block 710. In process block 730, an agent can execute on the launched virtual machine instance. Typically, after launching, the virtual machine instance is designed to execute the agent automatically. The agent can then obtain a virtual machine instance identifier associated with the virtual machine. Such identifier information can be available to the agent through a variety of techniques, such as the agent requesting the identifier from a service within the service provider or reading the identifier from local storage. Using the identifier, the agent can send a request to the configuration service 450 asking for the stored configuration information. The configuration service can then use the identifier as a key or part of a key to search storage and obtain the configuration information. Alternatively, the identifier can be used to generate the key, such as through an algorithm (e.g., hashing or otherwise). The configuration information can then be passed back to the agent for analysis. In process block 740, the agent can search through the configuration for different headings that are used to divide the configuration information into sections. Each section can be associated with a different plug-in which the agent can determine to use for the configuration of the virtual machine instance. The agent can then execute the determined plug-ins to configure the instance. For example, by configuring the instance, an operating system and/or applications associated with the instance can be brought to a predetermined state.

The embodiment of FIG. 7 can be extended to manage multiple virtual machine instances using the configuration information. Thus, to manage a fleet of virtual machine instances, the configuration service can associate multiple identifiers with the same configuration information. In this way, any updates to the configuration information can be automatically applied to multiple instances through updating a single configuration document. Additionally, the agent can be used at any time and can remain executing. As a result, the method can be implemented independent of the launching process block 710.

Figure 8:
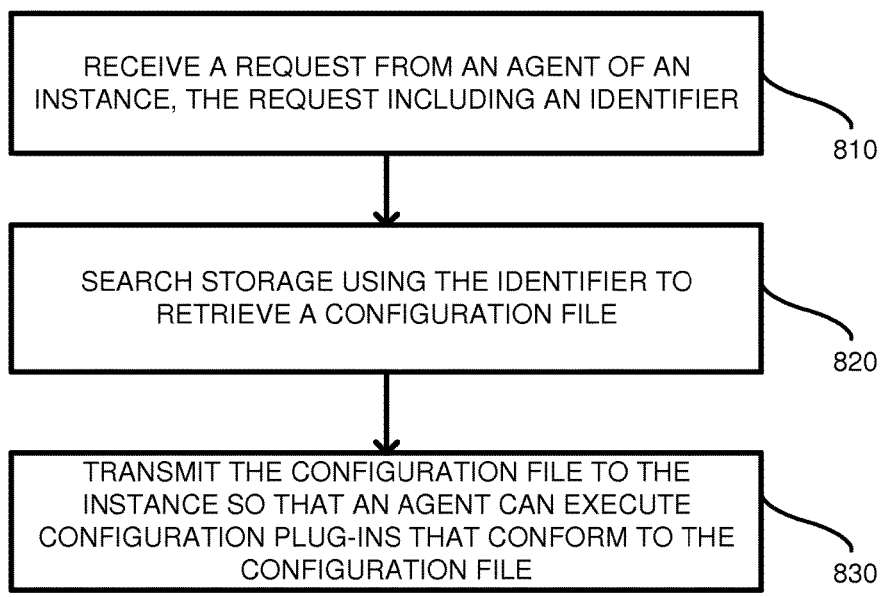
FIG. 8 is a flowchart according to another embodiment for configuring a virtual machine instance.

FIG. 8 is a flowchart according to another embodiment. In process block 810, a request is received from an agent executing in an instance. The request can be an API request or other request type. The recipient can be a Web service or other service in a client/server relationship. Typically, the service is running on a server computer in a service provider, such as a cloud provider. The request can include an identifier of the instance. The identifier of the instance can be a GUID or other type of alphanumeric, numeric, etc., identifier that associates the instance to a configuration document. In process block 820, storage can be searched using the identifier to retrieve a configuration file. Thus, in response to receiving the request, the service can use the identifier in the request to search a database or other storage types. The identifier can also be used either alone or in conjunction with other identifiers (e.g., a customer number) to build a pointer to an object or to search storage. As is well understood in the art, a variety of techniques can be used to retrieve the desired configuration file. In process block 830, the retrieved configuration file can be transmitted to the agent within the instance. Transmission back to the instance can be in the form of a reply to the request or providing a pointer used by the agent to retrieve the configuration information. The agent can then execute configuration plug-ins that conform the configuration of the instance to the configuration information. Typically, the agent performs the configuration after the instance is launched and brings a state of the instance to a desired configuration state. For example, various settings can be configured, various applications can be launched, and the operating system can be brought into a desired state. Typically, the configuration relates to software settings on the instance, as opposed to which hardware the instance is launched upon. In other words, the configuration occurs after the hardware and operating system are already chosen. Rather, it is how to configure the already executing instance in this embodiment. In some embodiments the configuration file can be a text file having multiple sections, each section being associated with one or more plug-ins so as to implement the configuration. The plug-ins are executable on the instance and execution is initiated by the agent, such as through a call to the plug-in, which can be a sub-routine or object.

Updates to the configuration file can be received and automatically applied to the instance. For example, the agent can periodically request the service for the configuration file using the already described techniques and receive the configuration file including any updates that have occurred since the agent last received the configuration file. The updates can be in a special section, or the agent can simply apply any new configuration attributes that have not already been applied. Because the configuration file can be associated with multiple virtual machine identifiers, a fleet of virtual machines can be updated through updating of a single configuration file.

Figure 9:
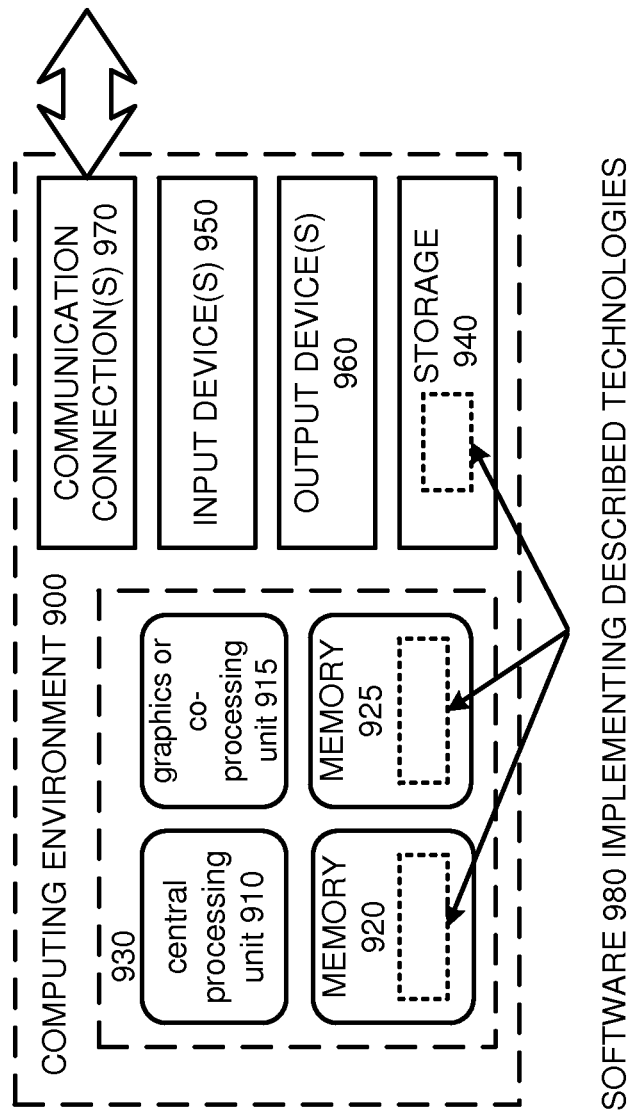
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of configuring virtual machine instances in a service provider, the method comprising:

in response to a user request, launching a virtual machine instance, the virtual machine instance having a first virtual machine instance identifier associated therewith;

storing configuration information using a service of the service provider, the configuration information being associated with two or more virtual machine instance identifiers including the first virtual machine instance identifier;

after launching the virtual machine instance, executing an agent on the virtual machine instance, the agent using the first virtual machine instance identifier to retrieve the configuration information from the service, wherein the agent includes two or more plug-ins that are stored locally so that the agent does not retrieve the plug-ins in response to retrieving the configuration information;

determining from the configuration information, by the agent, which of the two or more plug-ins to execute; and selecting, by the agent, the determined two or more plug-ins to configure the virtual machine instance, wherein others of the two or more plug-ins are not used to configure the virtual machine instance.

2. The method of claim 1, further comprising managing multiple virtual machine instances using the configuration information, the multiple virtual machine instances being associated with the two or more virtual machine instance identifiers.

3. The method of claim 1, further including receiving an Application Program Interface (API) request associating an additional virtual machine instance identifier to the configuration information.

4. The method of claim 1, further including receiving an update to the configuration information and applying the updated configuration information to the two or more virtual machine instances associated with the virtual machine instance identifiers.

5. The method of claim 1, wherein the virtual machine instance includes an operating system and one or more applications executing at a predetermined state based on the configuration information.

6. The method of claim 1, wherein the configuration information is a text file including multiple sections, and wherein each section is associated with one of the two or more plug-ins.

7. A computer-readable storage medium, which is non-transitory, including instructions that upon execution cause a computer system to:

at a service of a service provider, receive a request for configuration information of an instance, from an agent on the instance, the request including an identifier of the instance, wherein the instance is a virtual machine instance that was launched in response to a user request;

use the identifier of the instance to retrieve a configuration file including configuration information for the instance, wherein the configuration information is associated with two or more instance identifiers including the identifier of the instance; and transmit the configuration file to the instance so that the agent selects, for execution, one or more of a plurality of configuration plug-ins stored within the instance prior to receiving the configuration file, the selected plug-ins conforming a configuration of the instance to the configuration information, wherein others of the plurality of plug-ins are not used to configure the instance and wherein the agent includes the plurality of plug-ins.

8. The computer-readable storage medium of claim 7, wherein the instructions, upon execution, further cause the computer system to:
store the configuration file associated with multiple identifiers so that the configuration file is used to configure multiple instances.

9. The computer-readable storage medium according to claim 7, wherein the instructions, upon execution, further cause the computer system to:
store different configuration files for different customers of the service provider.

10. The computer-readable storage medium of claim 7, wherein the instructions, upon execution, further cause the computer system to:
in the service, receive an Application Programming Interface (API) request to associate an additional identifier with the configuration file.

11. The computer-readable storage medium of claim 7, wherein the configuration file is a text file having multiple sections, each section being associated with a respective plug-in that is executable on the instance.

12. The computer-readable storage medium of claim 7, wherein the configuration information is for configuring at least an operating system and applications executing on the instance.

13. The computer-readable storage medium of claim 7, wherein the instructions, upon execution, further cause the computer system to:
receive an update to the configuration file and apply the updated configuration file to two or more instances executing in the service provider.

14. The computer-readable storage medium of claim 7, wherein the instructions, upon execution, further cause the computer system to:
periodically request for the configuration file so as to detect any updates.

15. A system, comprising:
one or more server computers executing instances in a multi-tenant environment, wherein the instances are virtual machine instances launched in response to user requests;
a configuration server computer executing a configuration service within the multi-tenant environment;
storage coupled to the configuration server computer for storing configuration information in association with two or more identifiers, wherein the two or more identifiers are associated with the instances; and
an agent, comprising a plurality of plug-ins and executing on at least one of the instances, for communicating with the configuration server to obtain the configuration information using one of the two or more identifiers and for configuring the at least one of the instances by selecting two or more of the plurality of plug-ins to execute based on the obtained configuration information, the plug-ins being stored within the instance prior to the configuration information being obtained, wherein others of the plurality of plug-ins are not used to configure the instance.

16. The system of claim 15, further comprising:
a control engine within the agent for periodically requesting the configuration information from the configuration server computer.

17. The system of claim 15, wherein at least one of the instances includes an operating system executing thereon with application programs executing on the operating system.

18. The system of claim 15, wherein the configuration server includes an authentication component for authenticating at least one of the instances.

* * * * *